United States Patent [19]
Banning

[11] 3,796,949
[45] Mar. 12, 1974

[54] SLOTTED LINE WITH MATCHED FEED DETECTOR

[75] Inventor: Harmon W. Banning, Durham, Conn.

[73] Assignee: Andrew Alford, Winchester, Mass.

[22] Filed: Jan. 22, 1973

[21] Appl. No.: 325,232

[52] U.S. Cl. ............................................... 324/58 B
[51] Int. Cl. ............................................. G01r 27/04
[58] Field of Search ............ 324/58 R, 58 B, 58.5 B

[56] References Cited
UNITED STATES PATENTS

| | | | |
|---|---|---|---|
| 2,522,563 | 9/1950 | Blitz | 324/58 B |
| 3,693,078 | 9/1972 | Sorger | 324/58 B |
| 3,704,409 | 11/1972 | Oomen | 324/58 B X |

OTHER PUBLICATIONS

De Ronde, X–Band Reflectometer, IEEE Transactions on Microwave Theory and Techniques, pp. 435–440, July 1965.

Primary Examiner—Stanley T. Krawczewicz
Attorney, Agent, or Firm—Robert T. Dunn

[57] ABSTRACT

In a high frequency system for measuring standing wave ratio (SWR) measurements with a slotted transmission line having a probe moveable along the slotted transmission line and a stationary detector at the feed end of the slotted line that is intended to duplicate or match the moveable probe so that signals at the stationary detector and moveable probe when compared yield a signal representative of the SWR in the line, the stationary detector is a directional coupler for which the signal attenuation versus frequency characteristic from the primary to the secondary line thereof, matches the signal attenuation versus frequency characteristic from the feed end of the slotted line through the moveable probe. Thus, the frequency response of the matched detectors at the outputs of the moveable probe and directional coupler are substantially identical except for variations along the slotted line caused by the standing wave being measured.

10 Claims, 5 Drawing Figures

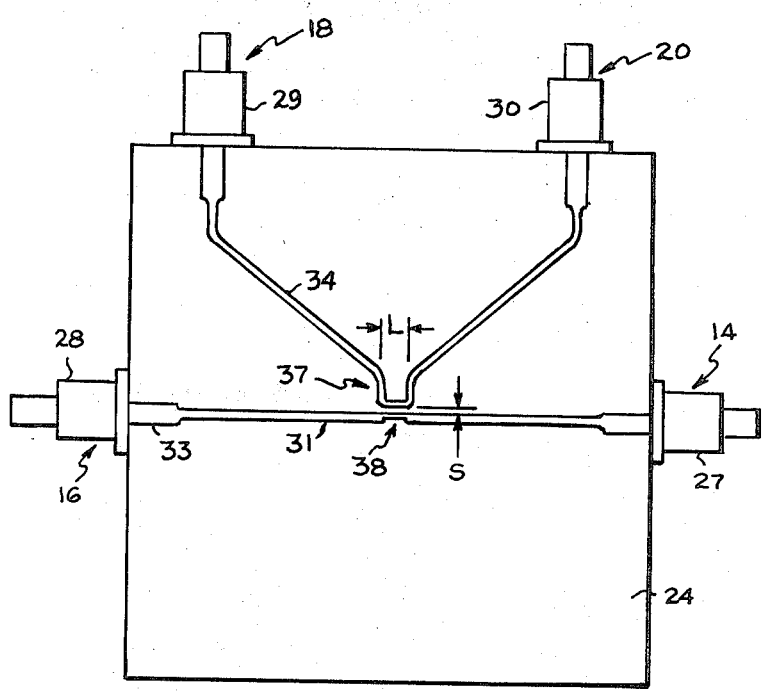
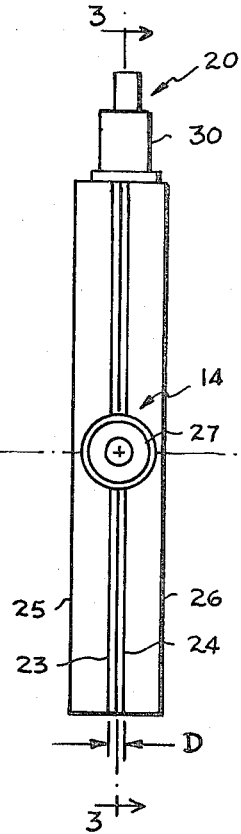
FIG 3
FIG 4

SLOTTED LINE WITH MATCHED FEED DETECTOR

This invention relates to high frequency systems using a slotted transmission line and probe with a reference signal detector at the feed end of the slotted line and more particularly, to such a system used for measuring standing wave ratio (SWR) in the slotted line for a load under test connected to the other end of the slotted line.

The slotted transmission line section with a moveable probe along the slot is widely used for evaluating the SWR at the input of a high frequency device or system. The system or device under test is coupled to one end of the slotted transmission line section and high frequency energy from a source feeds the other end of the section. In one known configuration, the source is a sweep oscillator having its output connected to the input of a short transmission line section having a stationary coupled detector probe located at the feed end of the slotted transmission line section. This coupled stationary detector probe is intended to have a frequency response characteristic which duplicates the frequency response characteristic of the moveable probe in the slotted line. That is, the signal attenuation versus frequency characteristics of these probes ideally should be matched. When they are matched, the ratio of the output from the moveable probe to the output from the stationary probe remains substantially constant as frequency is varied. Variations along the slotted line due to reflection which sets up standing waves in the slotted line from the device under test are then easier to observe and can be measured more accurately. It is usual practice to employ a ratio taking display devices to display this ratio of outputs. The length of the slotted line is preferable at least a half of an electrical wavelength at the lowest frequency in the test frequency range.

Heretofore, it has been common practice to obtain the reference signal at the feed end of the slotted line with a stationary sampling probe followed by a series resistor or resistance pad. The stationary probe is assumed to be similar to the moveable probe in the slotted line. The use of such a sampling probe in series with a 50 ohm resistor (when $Z_0 = 50$ ohms) results in at least 6 db loss and offers a relatively low quality source output impedance, particularly at frequencies in the range 12.4—18 Gh$\zeta$.

It is one object of the present invention to provide an improved reference signal detector at the feed end of a slotted line for producing the reference signal for comparison with the signal detected by the moveable probe in the slotted line and by which the above mentioned and other disadvantages accompanying the use of a stationary probe with pad or resistor to provide the reference signal at the feed end of a slotted line are avoided.

It is another object of the present invention to provide an improved system for measuring high frequency standing waves.

It is another object to provide an improved slotted line system for making standing wave ratio measurements.

It is another object to provide means for producing a reference signal at the feed end of a slotted transmission line section which has a moveable probe, such that the frequency response characteristics of the said means matches the frequency response characteristics of the probe.

It is a further object of the present invention to provide means producing the reference signal for a slotted line SWR measuring system that has an output frequency characteristic that approximates that of the slotted line moveable probe, for example over a useable frequency range that includes 2 to 18 Gh$\zeta$.

It is a further object in addition to the above that said means introduce relatively little insertion loss from the source to the slotted line. Furthermore, the directivity permits a relatively high quality impedance back match to be provided at the output of the source as seen from the feed end of the slotted line looking back toward the source.

In accordance with an embodiment of the present invention described herein, the reference signal for comparison with the signal from the moveable probe in a slotted line is obtained from one of the ports of the secondary line of a directional coupler at the feed end of the slotted line, the primary line of the directional coupler conducting power from a high frequency source to the slotted line. The directional coupler is designed so that the signal attenuation versus frequency characteristics from the primary to the secondary line thereof exhibits a minimum at the center frequency $f_0$ thereof, which is above the test frequency range.

The directional coupler for providing the reference signal at the feed end of the slotted line preferably includes a single section secondary line and the length of the single section is one-quarter of an electrical wavelength, $\lambda_0/4$ at frequency $f_0$ thereof, which is above the frequency range which is to be swept during the measurement with the slotted line.

Other objects, features and advantages of the present invention will be apparent from the following description of an embodiment of the invention which represents the best known use of the invention. This embodiment is shown in the accompanying drawings in which:

FIG. 3 shows the electrical structure of the directional coupler at the feed end of the slotted line section;

FIG. 4 is an end view of the directional coupler; and

Figure 1:
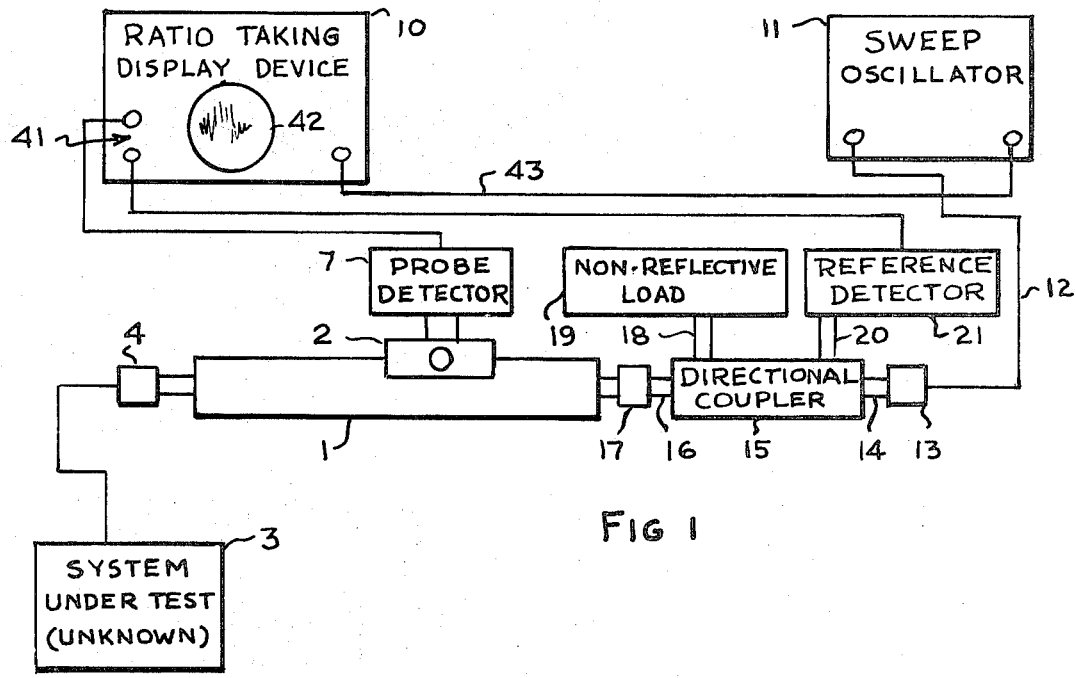
FIG. 1 represents a system employing a slotted coaxial line and moveable probe with a test system coupled to one end of the slotted line for measuring the standing wave in the line as an indication of the parameters and performance of a device under test.

Much of the system shown in FIG. 1 is conventional and is used widely for measuring standing wave ratio (SWR) in a slotted line which has a test system coupled to the output end of the line. As is usual with measuring systems of this sort, a sweep oscillator provides high frequency energy at the feed end of the slotted line where a stationary detector is located for providing a reference signal. The ratio of the signal from the moveable probe of the slotted line to this reference signal is presented on a ratio taking display device. If the reference signal detector at the feed end of the slotted line and the probe are matched, (that is to say they have the same signal attenuation vs. frequency characteristics) the ratio of these will be constant with frequency except for variations caused by the standing wave to be measured as the moveable probe travels along the slotted line.

The standing wave measuring system includes a slotted coaxial transmission line section 1 equipped with a moveable probe in a carriage 2 which may be translated along the slotted line section over an electrical distance which is at least a half-wavelength long at the lowest frequency within the test range. The high frequency device 3 under test is connected at connector 4 to the output end of the slotted line. The slotted line, probe and carriage are shown also by the section view in FIG. 2. Here, the probe is represented by the conductor 5 and is a pin type probe that is connected to the center conductor of a coaxial line section 6 from the probe to the probe diode detector 7. The probe 5 samples the electric field between the outer conductor 1 and the inner conductor 8. For the sake of simplicity, one may think of the probe coupling as capacitive to the conductor 8 and to the surrounding walls 9 that form the outer conductor of the slotted line. This mental picture if only approximate, but does describe the major position of the behavior of the pin probe.

Figure 5:
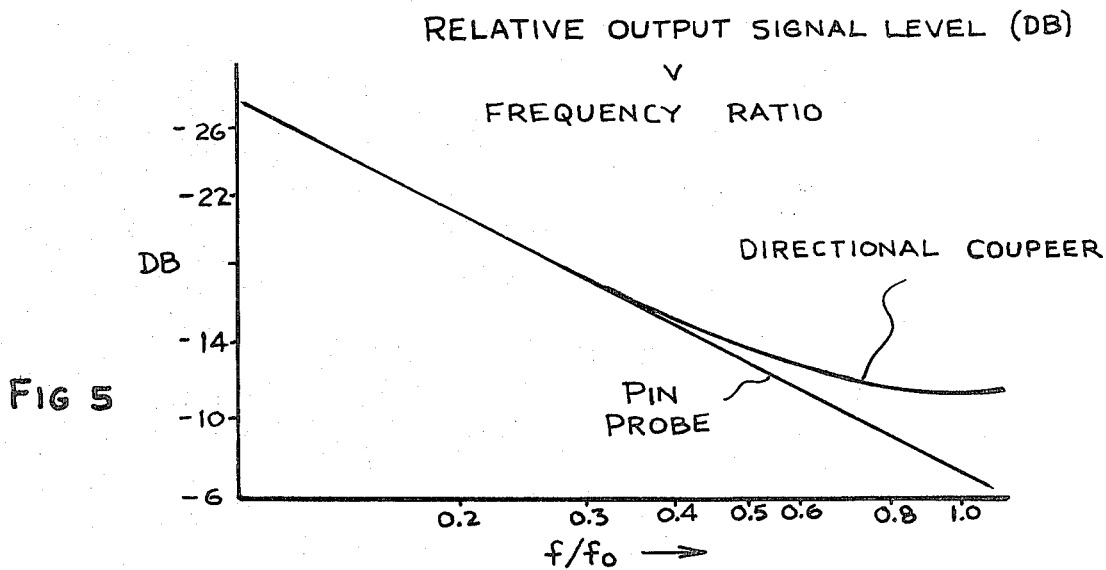
FIG. 5 shows plots of output signal level in db versus frequency for the directional coupler from the primary to the secondary line thereof in the direction from the high frequency source to the reference signal detector that is connected to the secondary line and for the moveable probe from the feed end of the slotted line through the moveable probe.

In FIG. 5 the curve denoted "Pin Probe" shows the characteristic of a moveable pin probe. This curve is a plot of relative output signal level in db from the feed end 17 of the slotted line to the output of the probe, versus frequency. The output end of the slotted line is assumed to be terminated into a matched load.

A sweep oscillator 11 feeds high frequency energy through line 12 and coupling 13 which is connected to an input port 14 of a directional coupler 15. The output port 16 of the directional coupler and input port 14 are at opposite ends of the primary line in the coupler. The insertion loss from port 14 to 16 of the coupler is relatively low or negligible.

The secondary line in the directional coupler 15 is connected at one end through port 18 to a non-reflective load 19 and connects at the other end via port 20 to the reference signal diode detector 21. The detectors 7 and 21 are preferably matched crystal detectors so as to retain the advantages gained by matching the directional coupler (reference signal detector) to the moveable probe. The outputs from these crystal detectors are compared in the ratio taking display device 10.

The primary and secondary lines in the directional coupler 15 are designed so that the response characteristics represented by a plot of relative output signal level versus frequency from the input port 14 to port 20 that feeds the reference signal crystal detector, closely approximates the same characteristics for the pin probe from the feed end 17 of the slotted line 1 to the output line 6 from the moveable probe. The directional coupler 15 is preferably a single section coupler and so has only a single section in the secondary line thereof and that section has an electrical length which is one-quarter wavelength, $\lambda_0/4$, of the center frequency $f_0$, of the coupler. Furthermore, the coupler is so designed that $f_0$ if greater than the highest frequency in the test range to be used in the SWR measurements, preferably by a factor F which is at least 1.3 or greater.

The insertion loss from port 14 to 20 of the directional coupler approximates that of the slotted line probe, provided the directional coupler has but one section in the secondary line and is operated over frequencies lower that the center frequency $f_0$ of the directional coupler at which the said insertion loss is minimum. More particularly, when such a directional coupler is used at a frequency of about one-half $f_0$ and lower, the relative output signal level versus frequency characteristic from port 14 to 20 of the coupler follows closely that of the pin-type pick-up probe, shown diagrammatically in FIG. 2. A suitable configuration of such a directional coupler is shown in FIG. 3.

In FIG. 3, the directional coupler illustrated is formed in strip line. The simple single stage coupler is printed on a sheet of teflon glass 23 having a dielectric constant of about 2.25 with copper layers 0.0014 inches thick on both sides. The copper layer on the side of this sheet opposite the printed circuit may be peeled off and the printed circuit is then sandwiched, between sheet 23 and a plain sheet of teflon glass 24, the same thickness, both sandwiched between two aluminum plates 25 and 26. The two aluminum plates are separated approximately 0.062 inches (dimension D) and the four port connections, 14, 16, 18 and 20 to this printed circuit are provided using female connectors 27 to 30, respectively.

The connectors connect to opposite ends of the directional coupler primary line 31 at transformer sections 32 and 33 at each end of that line. Connectors 29 and 30 connect to the ends of the coupler secondary line 34 at transformer sections 35 and 36. The secondary line has a single coupling section 37 for which the electrical length, denoted L, is substantially $\lambda_0/4$, and which couples to a narrowed section 38 of the primary line. The separation of the primary and secondary lines at the coupling section is denoted S. Suitable values of S, L and D for a coupler of this type used as described herein for the test frequency range from 2 to 18 GHz are as follows:

$$S = 0.003 \text{ inches}$$

$$L = 0.080 \text{ inches}$$

$$D = 0.062 \text{ inches}$$

The directivity obtained with a directional coupler of this arrangement is found to be about 13 db when a good external load is used. The construction and functioning of a directional coupler of this type is described in U.S. Pat. No. 3,581,243, dated May 25, 1971, and titled "Directional Coupler Wherein Dielectric Media Surrounding Main Line Is Different From Dielectric Media Surrounding Coupled Line." A somewhat higher directivity can be obtained by making use of the coupler arrangement described in that patent.

FIG. 5 contains a plot of relative output signal level versus frequency from port 14 to port 20 of the directional coupler, constructed as illustrated in FIGS. 3 and 4, denoted "Directional Coupler." This curve reaches a minimum at $f/f_0$ equals 1.0 or $f=f_0$. Clearly, over a section of this curve below $f/f_0$ about 0.8 (F above 1.25), the curve closely approximates the characteristic of the moveable probe over the same frequency range as represented by the curve denoted Pin Probe. As a result, the ratio of the signal from the probe to the signal from port 20 of the coupler is constant with frequency except for variations caused by the standing wave being measured in the slotted line.

Figure 2:
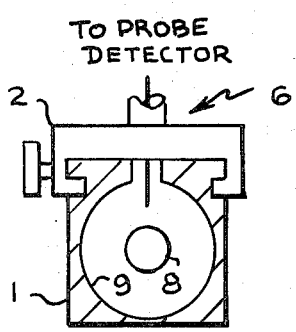
FIG. 2 is a sectional view through the slotted transmission line section showing the moveable pin probe and carriage.

In a particular test system of the kind shown in FIG. 1, for operating over a useable frequency range of 2 to 18 GHz, with a coaxial slotted line section and pin-type moveable probe such as shown in FIG. 2, a suitable directional coupler, for producing the reference signal constructed as described herein may have a 12 db coupling factor at the center frequency $f_0$ of the coupler. The center frequency $f_0$ should preferably be higher than 24 GHz when the coupler is to be used between 2 and 18 GHz. Furthermore, the directivity of the coupler should preferably be at least about 12 db, although a higher directivity would, of course, be desirable. With a coupler of this description, the relative attenuation between ports on the same line such as from port 14 to port 16 is very low or negligible, whereas alternate ports such as port 14 and port 18 are for practical purposes uncoupled. The relative attenuation between adjacent ports such as ports 14 and 20 is represented by the plot "Directional Coupler" in FIG. 5.

The system is FIG. 1 shows the outputs of the probe and reference crystal detectors, 7 and 21 connected to the ratio terminals 41 of the ratio taking display device 10. The ratio controls the vertical sweep of a cathode ray tube (CRT) display 42 in the device. The horizontal sweep of the display at terminal 43 may be controlled by a frequency sweep signal in line 44 from sweep oscillator 11. In operation, when the oscillator sweeps over a frequency range for which $f/f_0$ is below 0.8 (see FIG. 5) and the moveable probe carriage 2 is moved a sufficient distance along the slotted line 1, multiple traces are generated on the CRT display 42. If this series of traces is preserved, for example, by storing or recording on film or paper, the width of the resulting pattern, as a function of frequency corresponds to the SWR of the device under test.

The embodiment of the present invention described herein, represents the best known use of the invention and incorporates the principal features of the invention. Various modifications in construction, arrangement and operation of the apparatus illustrated in this embodiment can be made within the scope and spirit of the invention set forth in the appended claims.

What is claimed is:

1. In a high frequency system for comparing the signal from a transmission line probe with a reference signal derived from a variable frequency source, that feeds the transmission line, means coupled to the variable frequency source at the input of the transmission line for providing the reference signal, said means having a frequency response that substantially matches the response of the probe comprising,
   a four terminal directional coupler,
   the primary line of said directional coupler conducting power from the source to the transmission line,
   the secondary line of said directional coupler being connected at one end to a substantially non-reflective load and producing the reference signal at the other end thereof, and
   the minimum relative signal attenuation from the primary to the secondary line of the coupler occurring at a frequency $f_0$ which is greater than the greatest frequency from the source used in the said comparison.

2. In a high frequency system as in claim 1 wherein, the relative signal attenuation from the source end of the primary line to the non-reflective load is substantially greater than from said source end to the reference signal end of the secondary line.

3. In a high frequency system as in claim 2 wherein, the relative signal attenuation versus frequency response characteristic from the source end of the primary line to the reference signal end of the secondary line and the same characteristic from the feed end of the coaxial transmission line to the probe, over a frequency range below $f_0$, have substantially the same slope.

4. In a high frequency system as in claim 3 wherein, the secondary line in the directional coupler includes a section having an electrical length which is one-quarter of an electrical wavelength at the frequency $f_0$.

5. In a high frequency system as in claim 1 wherein, the probe connects to a detector,
   the other end (reference signal end) of the secondary line of the directional coupler connects to a detector, and
   means are provided for comparing the outputs of said detectors while the source frequency is swept over a frequency range below $f_0$.

6. In a high frequency system as in claim 5 wherein, the detectors are matched crystal detectors.

7. In a system for making standing wave ratio (SWR) measurements with a probe in a slotted coaxial line section, means coupling a source of swept high frequency signals to the input of the coaxial line section, said means having a frequency response that substantially matches the frequency response of the probe over the swept frequency range, comprising,
   a four terminal directional coupler,
   the primary line of said directional coupler conducting power from the source to the coaxial transmission line,
   the secondary line of said directional coupler being connected at one end to a substantially non-reflective load and producing the reference signal at the other end thereof, and
   the minimum relative signal attenuation from the primary to the secondary line of the coupler occurring at a frequency $f_0$ which is substantially above the swept frequency range for which said measurements were made.

8. In a system as in claim 7 wherein, the relative signal attenuation versus frequency response characteristic from the source end of the primary line to the reference signal end of the secondary line and the same characteristic from the feed end of the coaxial transmission line to the probe, over the swept frequency range, have substantially the same slope.

9. In a system as in claim 8 wherein, the secondary line in the directional coupler includes a section having an electrical length which is one-quarter of an electrical wavelength at the frequency $f_0$.

10. In a system as in claim 9 wherein, the probe connects to a detector, the other end (reference signal end) of the secondary line of the directional coupler connects to a detector, and means are provided for comparing the outputs of said detectors.

* * * * *